US006963752B1

(12) United States Patent
Nilsson

(10) Patent No.: US 6,963,752 B1
(45) Date of Patent: Nov. 8, 2005

(54) METHOD AND APPARATUS FOR SETTING TRANSMIT POWER CONTROL COMMAND ENERGY

(75) Inventor: Johan Nilsson, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 780 days.

(21) Appl. No.: 09/663,269

(22) Filed: Sep. 18, 2000

(51) Int. Cl.$^7$ .............................................. H04B 7/00
(52) U.S. Cl. ....................................... 455/522; 455/69
(58) Field of Search .......................... 455/69, 70, 522, 455/68, 127.1, 126, 127.2; 370/311, 318, 329, 331, 335, 441

(56) References Cited

U.S. PATENT DOCUMENTS

| | | | | |
|---|---|---|---|---|
| 4,580,262 A | * | 4/1986 | Naylor et al. ............... | 714/708 |
| 5,204,970 A | | 4/1993 | Stengel et al. | |
| 5,485,486 A | * | 1/1996 | Gilhousen et al. .......... | 370/335 |
| 5,564,074 A | * | 10/1996 | Juntti ...................... | 455/67.11 |
| 5,794,129 A | * | 8/1998 | Komatsu .................... | 455/69 |
| 5,943,610 A | * | 8/1999 | Endo ........................ | 455/69 |
| 5,946,346 A | * | 8/1999 | Ahmed et al. .............. | 375/219 |
| 6,154,450 A | * | 11/2000 | Wallentin et al. .......... | 370/311 |
| 6,163,707 A | * | 12/2000 | Miller ...................... | 455/522 |
| 6,249,682 B1 | * | 6/2001 | Kubo et al. ................ | 455/522 |
| 6,330,456 B1 | * | 12/2001 | Hashem et al. ............. | 455/522 |
| 6,385,462 B1 | * | 5/2002 | Baum et al. ............... | 455/522 |
| 6,414,948 B1 | * | 7/2002 | Sato .......................... | 370/335 |
| 6,445,930 B1 | * | 9/2002 | Bartelme et al. ........... | 455/522 |

(Continued)

FOREIGN PATENT DOCUMENTS

| WO | WO 98/36508 A1 | * | 8/1998 |
|---|---|---|---|
| WO | 99/46869 | | 9/1999 |
| WO | 00/31893 A2 | | 6/2000 |

OTHER PUBLICATIONS

"Physical Channels and Mapping of Transport Channels onto Physical Channels (FDD)", Technical Specification No. 3G TS 25.211, ver.3.2.0, 3GPP (Mar. 2000).
Yang, Yu–Ju et al., "A Strength & SIR Combined Adaptive Power Control for CDMA Mobile Radio Channels", IEEE, 1996.
Oscar Salonaho, et al., "Flexible Power Allocation for Physical Control Channel in Wideband CDMA", XP–000903286, IEEE 1999.
Masafumi Usuda, et al., "Optimizing the Number of Dedicated Pilot Symbols for Forward Link in W–CDMA Systems", XP–000986979, IEEE 2000.

*Primary Examiner*—Charles N. Appiah
(74) *Attorney, Agent, or Firm*—Potomac Patent Group PLLC

(57) ABSTRACT

The energy at which a transmit power control is transmitted is set based on how important it is that the transmit power control command is received. As an indication of how important it is that the transmit power control command is received, a difference between a measured quality, e.g., SIR, of a received signal and a reference may be determined. The energy at which the transmit power control command is transmitted may be set based on this difference. The energy of the transmit power control command may be set by adjusting the power at which the transmit power control command is transmitted and/or by adjusting the coding of the transmit power control command. If the difference is determined to be substantially zero, the energy at which the transmit power control command is transmitted is decreased, by an amount that is a function of the difference. If the difference is determined not to be substantially zero, the energy at which the transmit power control command is transmitted is increased by an amount that is a function of the difference. This technique may be used for uplink transmit power control commands or for downlink power control commands. For uplink transmit power control commands, the technique is performed in the network, e.g., in a base station. For downlink transmit power control commands, the technique is performed in, e.g., a remote terminal.

16 Claims, 2 Drawing Sheets

U.S. PATENT DOCUMENTS

| | | | |
|---|---|---|---|
| 6,603,773 B2 * | 8/2003 | Laakso et al. | 370/441 |
| 6,643,272 B1 * | 11/2003 | Moon et al. | 370/311 |
| 6,687,510 B2 * | 2/2004 | Esteves et al. | 455/522 |
| 6,725,054 B1 * | 4/2004 | Hwang et al. | 455/522 |
| 6,788,685 B1 * | 9/2004 | Holtzman et al. | 370/391 |
| 2001/0012785 A1 * | 8/2001 | Esteves et al. | |
| 2004/0166884 A1 * | 8/2004 | Oh et al. | 455/522 |

* cited by examiner

| TFCI | Data 1 | TPC | Data 2 | Pilot |
FIG. 1
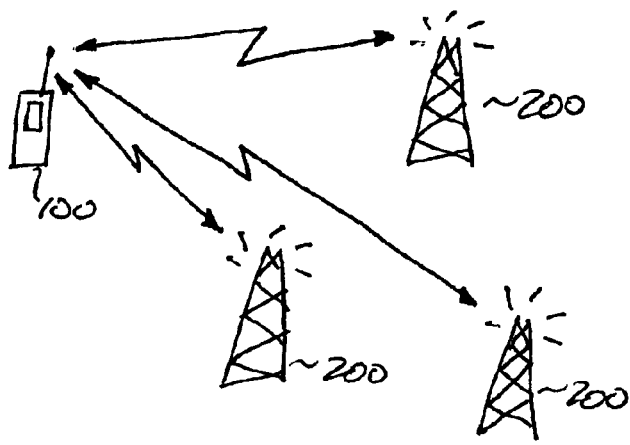
FIG. 2
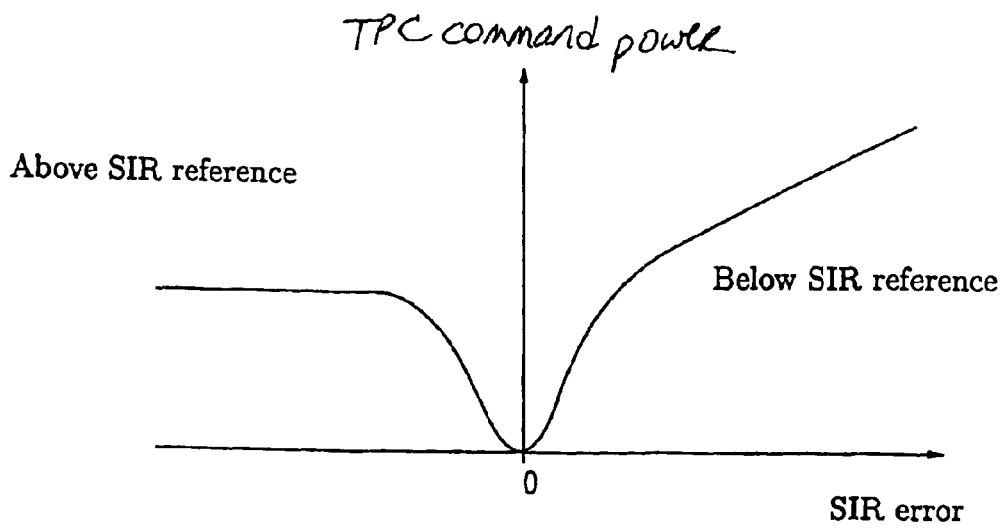
FIG. 3

METHOD AND APPARATUS FOR SETTING TRANSMIT POWER CONTROL COMMAND ENERGY

BACKGROUND

This invention relates to a method and apparatus for transmit power control. In particular, this invention relates to a method and apparatus for setting the energy at which a transmit power control command is transmitted.

Good transmit power control methods are important to communication systems having many simultaneous transmitters because such methods reduce the mutual interference of such transmitters. For example, transmit power control is necessary to obtain high system capacity in third generation communication systems that use wideband code division multiple access (W-CDMA). The goal of transmit power control is to use as low a transmission power as possible, thereby minimizing interference, while providing the desired quality. This is important for the uplink, i.e., for transmissions from a remote terminal to the network, e.g., a base station, as well as for the downlink, e.g., for transmissions from the network to the remote terminal.

Power control is commonly provided by a closed-loop method. For example, for uplink power control, a base station determines whether the uplink power should be increased or decreased based, e.g., on measured uplink signal strength, and then transmits an appropriate power control command to the remote station at regular intervals, e.g., every 1.25 milliseconds. Based on the power control command, the remote station increases or decreases its uplink transmit power by a predetermined amount. The power control command is typically transmitted as a bit, the value of which determines whether the transmit power of the remote station should increase or decrease, e.g., by a specified step. For example, a "zero" power control bit transmitted by the base station may cause the remote station to increase its transmit power level by 1 dB, and a "one" power control bit transmitted by the base station may cause the remote station to decrease its transmit power level by 1 dB.

The decision about which power control command to send to the remote terminal from the base station may be made by measuring the quality, e.g., the signal to interference ratio (SIR), of the received uplink signal and comparing the measured SIR with a reference SIR that represents an acceptable quality. If the measured SIR is lower than the reference SIR, the base station sends a command to increase the uplink transmit power to the remote terminal. If the measured SIR is above the reference SIR, the base station sends a command to decrease the uplink transmit power to the remote terminal. The remote terminal receives the command and changes its uplink transmit power, accordingly. A detailed example of uplink power control is provided in the TIA/EIA/IS-95-A standard.

Similarly, for downlink transmit power control, the remote terminal measures the quality, e.g., the SIR, of the received downlink signal, and the remote terminal transmits a report of the measured SIR or a power control command to the network, e.g., to the base station that the remote terminal is communicating with. Based on such a report or command, the power level (and thus the SIR) of the downlink signal is appropriately controlled by the network, e.g., the base station or another network entity, such as a radio network controller (RNC).

In a W-CDMA system, such as the Third Generation Partnership Program (3GPP) system, time is split into slots. In each slot, both data and control information are transmitted. Control information may include, for example, known pilot symbols and transmit power control (TPC) commands. The TPC commands that are sent on the downlink are used for power control of transmission on the uplink, and the TPC commands that are sent on the uplink are used for power control of transmission on the downlink. The downlink TPC commands inform the remote terminal how to change its transmit power, and the uplink TPC commands inform the base station how to change its transmit power.

An example of a 3GPP slot structure is shown in FIG. 1. Each slot includes the following fields: Transport Format Combination Indicator (TFCI), Data 1, TPC, Data 2, and Pilot. The TFCI field includes information regarding how the data is coded. The Data fields include the data being transmitted. The TPC field contains one or more TPC commands used for controlling the transmit power. The Pilot field contains information used for synchronization. Each of these fields may contain one or more symbols, the number of symbols depending on the implementation. The symbols may be repetition coded, e.g., the symbols may be repeated to ensure correct transmission. More details of an exemplary slot structure are given in "Physical Channels and Mapping of Transport Channels onto Physical Channels (FDD)", Technical Specification No. 3G TS 25.211, ver. 3.2.0, 3GPP (March 2000), herein incorporated by reference.

Conventionally, the transmit energy of the TPC command itself is not varied independently of the transmit power control. That is, there is currently no provision for individually setting the energy at which the TPC command is transmitted. The TPC command is transmitted at the same energy level that is set for transmission of other types of information. Thus, the TPC command transmit energy is not changed based on which command is sent or how important it is that the TPC command be received without transmission error.

If the measured SIR is very close to the reference SIR, it is not critical that the remote terminal receive commands from the network to increase or decrease the transmission power, because such commands would likely not affect the quality of the received signal. In such a case, the transmit energy of the TPC command could be decreased, without an adverse effect. This would decrease interference, thus increasing the system capacity. On the other hand, if the SIR is far below the reference SIR, it could be very important that a command instructing the remote terminal to increase the transmit power reach the remote terminal without transmission error. Otherwise, the call could be dropped. If the measured SIR is far above the reference SIR, it could also be important that a command to decrease the transmit power reach the remote terminal correctly to keep the interference caused by the remote terminal as low as possible.

Thus, there is a need for setting the energy at which a TPC command is transmitted based on how important it is that the TPC command is correctly received.

SUMMARY

It is therefore an object of the invention to set the energy at which a TPC command is transmitted based on how important it is that the TPC command is correctly received. It is yet another object of the invention to minimize interference caused by the transmission of TPC commands. It is yet another object of the invention to ensure that an important TPC command is received.

According to the invention, these and other objects are met by a method and apparatus for setting the energy at which a transmit power control command is transmitted. A determination is made how important it is that the TPC command is correctly received, and the energy at which the transmit power control command is set, based on this determination. The energy may be set by setting the power at which the TPC command is transmitted and/or by adjusting the coding of the TPC command.

According to an exemplary embodiment, as an indication of how important it is that the TPC command is received, the difference between a measured quality, e.g., the SIR, of a received signal and a reference may be determined. The energy at which the TPC command is transmitted is set based on this difference. If the difference is determined to be substantially zero, the energy at which the TPC command is transmitted is decreased by an amount that is a function of the difference. If the difference is determined not to be substantially zero, the energy at which the TPC command is transmitted is increased by an amount that is a function of the difference. This technique may be used for uplink TPC commands or for downlink TPC commands. For uplink TPC commands, the technique is performed in the network, e.g., in a base station. For downlink TPC commands, the technique is performed in, e.g., a remote terminal.

BRIEF DESCRIPTION OF THE DRAWINGS

The features and objects of Applicant's invention will be understood by reading this description in conjunction with the drawings, in which:

FIG. 1 illustrates an exemplary 3GPP slot structure;

FIG. 2 illustrates an exemplary communication system in which the invention may be implemented;

FIG. 3 illustrates graphically how energy at which the TPC command is transmitted may be set according to an exemplary embodiment.

DETAILED DESCRIPTION

Figure 4:
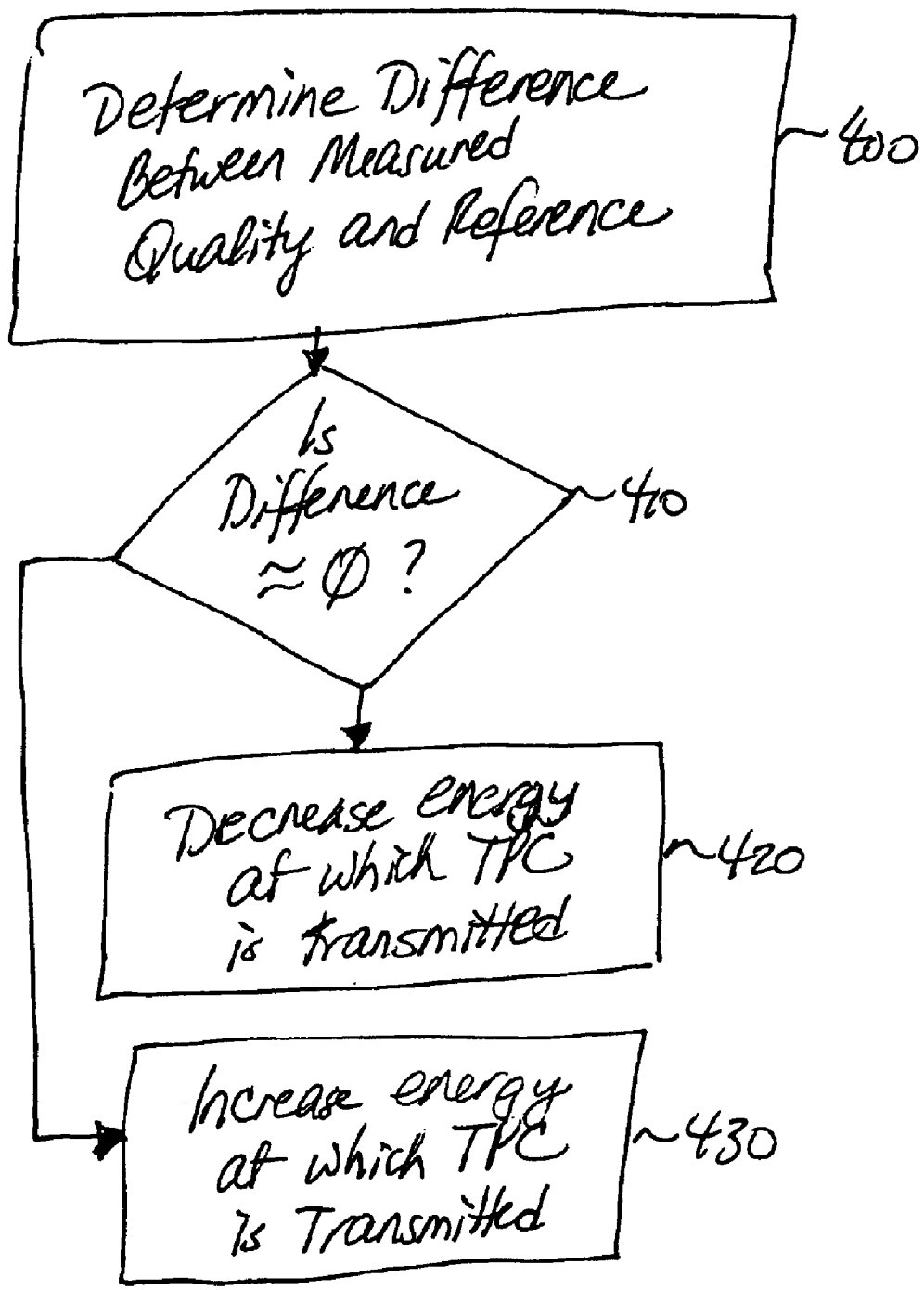
FIG. 4 illustrates a method for setting the energy at which the TPC command is transmitted according to an exemplary embodiment.

It should be understood that the following description, while indicating preferred embodiments of the invention, is given by way of illustration only since various changes and modifications within the scope of the invention will become apparent to those skilled in the art.

For ease of explanation, the following description is directed to uplink transmit power control. However, it will be appreciated that the technique is also applicable to downlink transmit power control.

According to exemplary embodiments, a method and apparatus are provided which enable the energy at which a TCP command is transmitted to be set. This may be understood by referring to FIG. 2, in which a remote station, e.g., a mobile station (MS) 100 or a fixed cellular station, is communicating with the network, e.g., one or more base stations (BS) 200. For uplink power control, the BS 200 measures the quality of the signal received from the MS 100, compares the measured quality with a reference representing an acceptable quality, and sends TPC commands to the MS 100, instructing the MS 100 to increase or decrease the uplink transmit power based on the comparison.

According to an exemplary embodiment, the energy at which the TPC command is transmitted may be adjusted, depending on how important it is that the MS 100 receives the TPC command correctly from the BS 200. If it is important that the TPC command be received, the energy at which the TPC command is transmitted may be increased. For example, the power at which the TPC command is transmitted may be increased and/or the coding of the TPC command may be adjusted, e.g., the TPC command may be heavily repetition coded. If it is not crucial that the TPC command be received, the energy at which the TPC command is transmitted may be decreased, e.g., the power at which the TPC command is transmitted may be decreased and/or the coding of the TPC command may be reduced or eliminated.

According to an exemplary embodiment, an indication of how important it is that the TPC command be received may be given by comparing the received signal with a reference signal. For this purpose, the BS 100 measures the quality of the received uplink signal, e.g., the SIR, and compares the measured SIR with a reference SIR, and, based on the difference, adjusts the energy at which the TPC command is transmitted if the difference is substantially zero, this indicates that the quality of the received signal is close to the desired quality and that changing the transmit power is not necessary. Thus, it is not important that the TPC command be correctly received. If the measured SIR is far below the reference, this indicates that the transmit power of the MS 100 must be increased to bring the quality of the uplink signal to an acceptable level. Thus, it is important that the TPC command instructing the MS 100 to increase the transmit power be received, so that the call is not dropped. If the measured SIR is far above the reference SIR, this means that the quality of the uplink signal is greater than necessary. Thus, it is important that the TPC command instructing the MS 100 to decrease the transmit power be received, so that interference is lowered.

FIG. 3 illustrates graphically how the energy at which the TPC command is transmitted may be set. In FIG. 3, the difference between the measured SIR and the reference SIR is represented as the SIR error, i.e., $$\text{SIR error} = \text{reference SIR} - \text{measured SIR}$$

For purposes of illustration, FIG. 3 illustrates how the power at which the TPC command is transmitted is set, depending on the SIR error. Although not shown, it will be appreciated that a similar function may be used for adjusting the coding of the TPC command, based on the SIR error.

As shown in FIG. 3, if the SIR error is low, e.g., less than the size of a 1 dB power step, the power at which the TPC command is transmitted is decreased by an amount that is a function of the difference. In such a case, the transmit power of the TPC command approaches zero. If the absolute value of the SIR error is high, e.g., greater than 1 dB, a higher transmit power is used to transmit the TPC command. The transmit power may be set as a function of the difference, approaching a maximum transmit power. The function may include one or more threshold values of SIR error at which the transmit power is increased or decreased by predetermined amounts.

FIG. 4 illustrates a method for setting the transmit power of the TPC command according to exemplary embodiments. The method begins by determining how important it is that the TPC command be received, e.g., by comparing the measured quality, e.g., SIR, with the reference, e.g., a reference SIR at step 400. At step 410, a determination is made whether the difference is substantially zero. If so, then at step 420, the energy at which the TPC command is decreased, e.g., the transmit power is decreased to approximately zero and/or the coding of TPC command is reduced or eliminated. If at step 410, the measured SIR is determined not to be substantially zero, then the energy at which the TPC command is transmitted is increased at step 430 by an amount that is a function of the difference, e.g., the transmit power is increased up to a maximum transmit power and/or the TPC command is heavily coded.

These steps may be performed in the network, e.g., in the BS 200, for uplink transmit power control. For downlink transmit power control, these steps may be performed in the remote terminal, e.g., the MS 100.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a communication system including at least one base station and at least one remote station and employing transmit power control, a method for controlling the energy at which a transmit power control command is transmitted, the method comprising the steps of:

determining a difference between a received signal quality and a reference; and setting the energy at which the transmit power control command is transmitted based on this determination, the setting including increasing the energy when the difference is determined not to be substantially zero, whether the received signal quality is above or below the reference.

2. The method of claim 1, wherein the step of setting the energy comprises setting the power at which the transmit power control command is transmitted.

3. The method of claim 1, wherein the step of setting the energy comprises adjusting the coding of the transmit power control command.

4. The method of claim 1, wherein if the difference is substantially zero, the step of setting the energy includes decreasing the energy at which the transmit power control command is transmitted.

5. The method of claim 4, wherein the energy is decreased by an amount that is a function of the difference.

6. The method of claim 1, wherein the energy is increased by an amount that is a function of the difference.

7. The method of claim 1, wherein the transmit power control is performed for the uplink direction, and the steps are performed in a base station.

8. The method of claim 1, wherein the transmit power control is performed for the downlink direction, and the steps are performed in a remote terminal.

9. In a communication system including at least one remote station and at least one base station, an apparatus for controlling the energy at which a transmit power control command is transmitted, comprising:

means for determining a difference between a received signal quality and a reference; and means for setting the energy at which the transmit power control command is transmitted based on this determination, the setting including increasing the energy when the difference is determined not to be substantially zero, whether the received signal quality is above or below the reference.

10. The apparatus of claim 9, wherein the means for setting the energy sets the power at which the transmit power control command is transmitted.

11. The apparatus of claim 9, wherein the means for setting the energy adjusts the coding of the transmit power control command.

12. The apparatus of claim 9, wherein if the difference is determined to be substantially zero, the energy at which the transmit power control command is transmitted is decreased.

13. The apparatus of claim 12, wherein the energy is decreased by an amount that is a function of the difference.

14. The apparatus of claim 9, wherein the energy is increased by an amount that is a function of the difference.

15. The apparatus of claim 9, wherein the transmit power control is performed for the uplink direction, and the apparatus is included in a base station.

16. The apparatus of claim 9, wherein the transmit power control is performed for the downlink direction, and the apparatus is included in a remote terminal.

* * * * *